United States Patent
Cordatos et al.

(10) Patent No.: US 12,221,222 B2
(45) Date of Patent: Feb. 11, 2025

(54) COOLING FLUID USED AS SECONDARY FUEL SOURCE

(71) Applicant: Hamilton Sundstrand Corporation, Charlotte, NC (US)

(72) Inventors: Haralambos Cordatos, Colchester, CT (US); Sean C. Emerson, Broad Brook, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/202,606

(22) Filed: May 26, 2023

(65) Prior Publication Data
US 2024/0391602 A1    Nov. 28, 2024

(51) Int. Cl.
*B64D 37/30* (2006.01)
*F02C 7/224* (2006.01)
(Continued)

(52) U.S. Cl.
CPC ............. *B64D 37/30* (2013.01); *F02C 7/224* (2013.01); *F02C 9/28* (2013.01); *F02C 9/40* (2013.01)

(58) Field of Classification Search
CPC ...... F02C 7/12; F02C 7/14; F02C 7/16; F02C 7/22; F02C 7/224; F02C 3/24; F02C 3/30;
(Continued)

(56) References Cited

U.S. PATENT DOCUMENTS 5,678,408 A * 10/1997 Janes ................... F02C 6/003
                                                          60/728
9,309,811 B2 * 4/2016 Swann ...................... F02C 9/40
(Continued)

FOREIGN PATENT DOCUMENTS

| CN | 104948303 B | 11/2017 | |
| CN | 115042977 A | 9/2022 | |
| WO | WO-2022079435 A1 * | 4/2022 | ............. B64D 37/30 |

OTHER PUBLICATIONS

Young, C.L., Fogg, P. G. T. (1985). Ammonia, amines, phosphine, arsine, stibine, silane, germane and stannane in organic solvents. International Union of Pure and Applied Chemistry. Solubility Data Series. vol. 21. pp. 1-360.
(Continued)

*Primary Examiner* — Alain Chau
(74) *Attorney, Agent, or Firm* — Carlson, Gaskey & Olds, P.C.

(57) ABSTRACT

An aircraft system includes a thermal load, a controller, a tank for storing a cooling liquid, and a supply system for moving the cooling liquid outwardly of the tank and through a control valve to the thermal load. A controller is programmed to control the supply system. A conduit downstream of the thermal load is configured to communicate the cooling liquid to a fuel metering unit. The fuel metering unit also receives fuel from a high pressure pump. The fuel metering unit is configured to deliver a mixture of the cooling liquid and the fuel into a combustor on an associated aircraft engine. The controller programmed to determine a percentage solubility of the cooling fluid into the fuel at a detected temperature and pressure of the fuel reaching the fuel metering unit. The cooling fluid is combustible and soluble in the fuel. An aircraft and a method are also disclosed.

21 Claims, 2 Drawing Sheets

(51) Int. Cl.
*F02C 9/28* (2006.01)
*F02C 9/40* (2006.01)

(58) Field of Classification Search
CPC .... F02C 9/26; F02C 9/263; F02C 9/28; F02C 9/40; B64D 37/30; B64D 37/34
See application file for complete search history.

(56) References Cited

U.S. PATENT DOCUMENTS

| | | | |
|---|---|---|---|
| 9,765,691 B2 | 9/2017 | Delgado et al. | |
| 9,957,892 B2 | 5/2018 | Pomerleau | |
| 10,100,748 B2 | 10/2018 | Kawai et al. | |
| 11,041,439 B2 | 6/2021 | Roberge | |
| 11,156,157 B2 * | 10/2021 | Ito | F02C 7/143 |
| 2012/0167547 A1 | 7/2012 | Zhang et al. | |
| 2014/0345289 A1 * | 11/2014 | Shershnyov | F02C 9/40 |
| | | | 60/39.463 |
| 2015/0100219 A1 * | 4/2015 | Swann | F02C 3/20 |
| | | | 701/100 |
| 2015/0315971 A1 | 11/2015 | Reitz et al. | |
| 2015/0337730 A1 * | 11/2015 | Kupiszewski | F02C 7/16 |
| | | | 60/39.465 |
| 2016/0146117 A1 * | 5/2016 | Swann | F02C 9/46 |
| | | | 60/39.19 |
| 2016/0195013 A1 * | 7/2016 | Epstein | C10L 10/08 |
| | | | 60/39.463 |
| 2020/0032712 A1 * | 1/2020 | Ito | F02C 3/22 |
| 2021/0229827 A1 * | 7/2021 | Doman | F02C 7/14 |
| 2021/0381429 A1 | 12/2021 | Taylor | |

OTHER PUBLICATIONS

Standard test method for estimation of solubility of gases in petroleum and other organic liquids. ASTM International. Designation: D3827-92 (Reapproved 2012). pp. 1-4.
European Search Report for EP Application No. 24177773.9 dated Sep. 27, 2024.

* cited by examiner

COOLING FLUID USED AS SECONDARY FUEL SOURCE

BACKGROUND

This application relates to an aircraft system and method wherein a cooling fluid for a heat load is combusted in a combustor of an engine.

Aircraft are being provided with increasingly sophisticated systems. Many of these systems create a heat load. As one example, a directed energy weapon or laser, may be used at unpredictable intervals. When used it creates a high heat load on the aircraft.

It is desirable to cool the system to preserve its operation. In addition, especially on military aircraft, it is important to mask the heat envelope of the aircraft. As such, cooling for such systems is important.

Other heat loads that may exist on an aircraft include power electronic controls, communication systems, radar jamming systems, etc.

While it has been proposed to use a cryogenic liquid as a heat sink, this would add a large parasitic load to the aircraft. It would include the weight of the cryogenic liquid itself, plus the weight of two tanks, one for storage before and another for storage after use. In addition, auxiliary components would be required.

SUMMARY

An aircraft system includes a thermal load, a controller, a tank for storing a cooling liquid, and a supply system for moving the cooling liquid outwardly of the tank and through a control valve to the thermal load. A controller is programmed to control the supply system. A conduit downstream of the thermal load is configured to communicate the cooling liquid to a fuel metering unit. The fuel metering unit also receives fuel from a high pressure pump. The fuel metering unit is configured to deliver a mixture of the cooling liquid and the fuel into a combustor on an associated aircraft engine. The controller is programmed to determine a percentage solubility of the cooling fluid into the fuel at a detected temperature and pressure of the fuel reaching the fuel metering unit. The cooling fluid is combustible and soluble in the fuel.

An aircraft and a method are also disclosed.

These and other features will be best understood from the following drawings and specification, the following is a brief description.

DETAILED DESCRIPTION

Applicant has recognized that certain combustible liquids are soluble in the fuel utilized by aircraft gas turbine engines. Aircraft gas turbine engines typically utilize aviation fuel.

A combustible liquid, which is soluble in aviation fuel, may be utilized to cool a thermal load on an aircraft. That liquid can then be sent to mix with the aviation fuel and burned in a combustor of the gas turbine engine. This eliminates any need for storing the cooling fluid after use, and also provides energy benefits.

Figure 1:
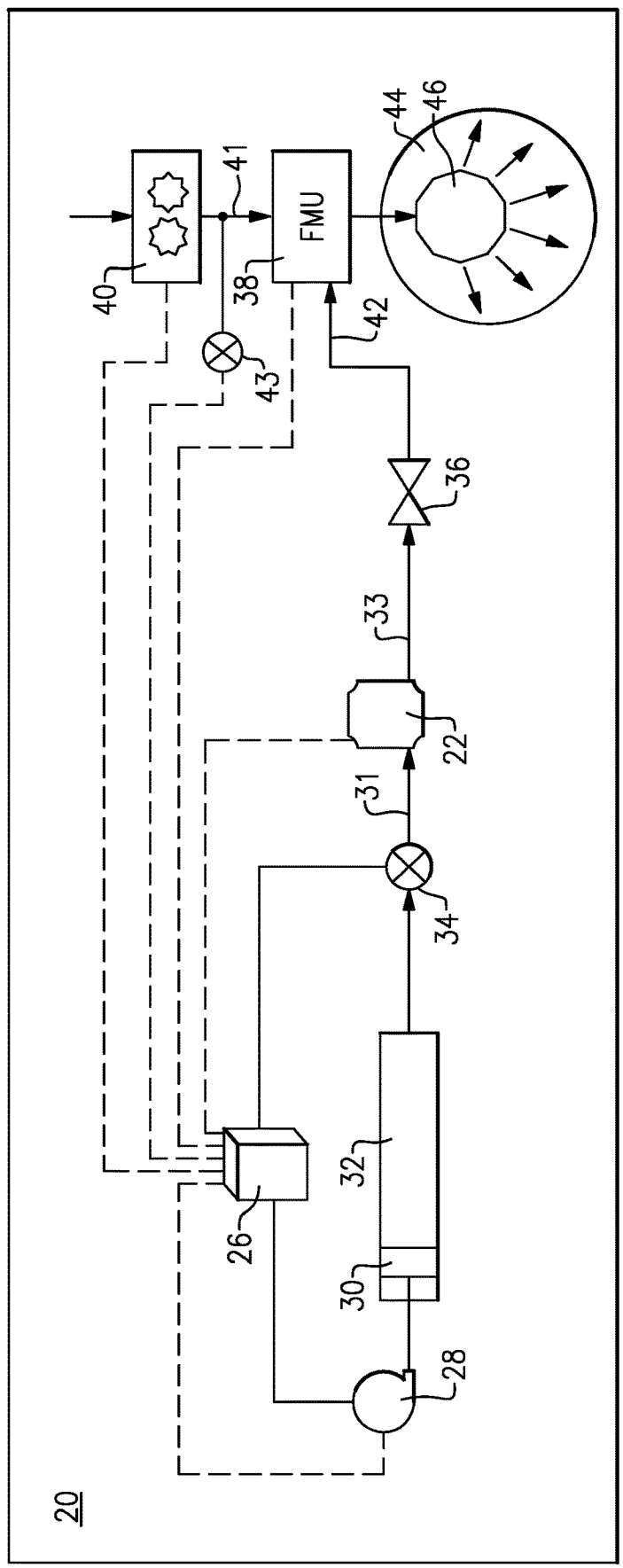
FIG. 1 schematically shows an aircraft with a fuel mixture cooling system.

An aircraft 20 is shown schematically in FIG. 1 having a thermal load 22. The thermal load 22 is a component on the aircraft which generates a high amount of heat that is desirably cooled.

As one example, the thermal load 22 may be a directed energy weapon, such as a laser. Such a system is operated at unpredictable intervals, and only periodically. However, when used it generates a large amount of heat. The thermal load must then be cooled, not only for the continued operation of the system, but also to reduce the aircraft's heat envelope and potential detection.

Another application for the thermal load 22 may be power electronics as associated with any number of components on the aircraft. In one application the aircraft 20 is a military aircraft.

Other systems which have periodic high thermal loads may include communication systems, radar jamming systems, etc.

As shown in FIG. 1, the thermal load 22 is provided with a cooling fluid supply system. In one method of driving the cooling fluid a stepper motor 28 controls the position of a piston 30. The piston 30 moves within a storage tank 32 for a cooling liquid. The cooling liquid is combustible and is also soluble in the fuel utilized by the aircraft gas turbine engine.

From the tank 32 the cooling liquid passes through a control valve 34. A controller 26 controls the supply system including the control valve 34 and the stepper motor 28 to deliver a precise volume of the cooling liquid into a line 31 and across the thermal load 22.

Downstream of the thermal load 22 the cooling liquid passes into a line 33 and through a check valve 36. The liquid then is delivered into a conduit 42 communicating the cooling liquid into a fuel metering unit 38.

The fuel metering unit 38 also receives aviation fuel through a line 41 connected to a high pressure pump 40. From the fuel metering unit, the fuel passes into a combustor 44 in the aircraft's gas turbine engine(s). The mixed cooling fluid and aviation fuel flow through fuel injectors 46 into combustor 44.

Applicant has recognized there are cooling fluids which are capable of providing a large amount of cooling but are also soluble at small percentages in aviation fuel.

Figure 2:
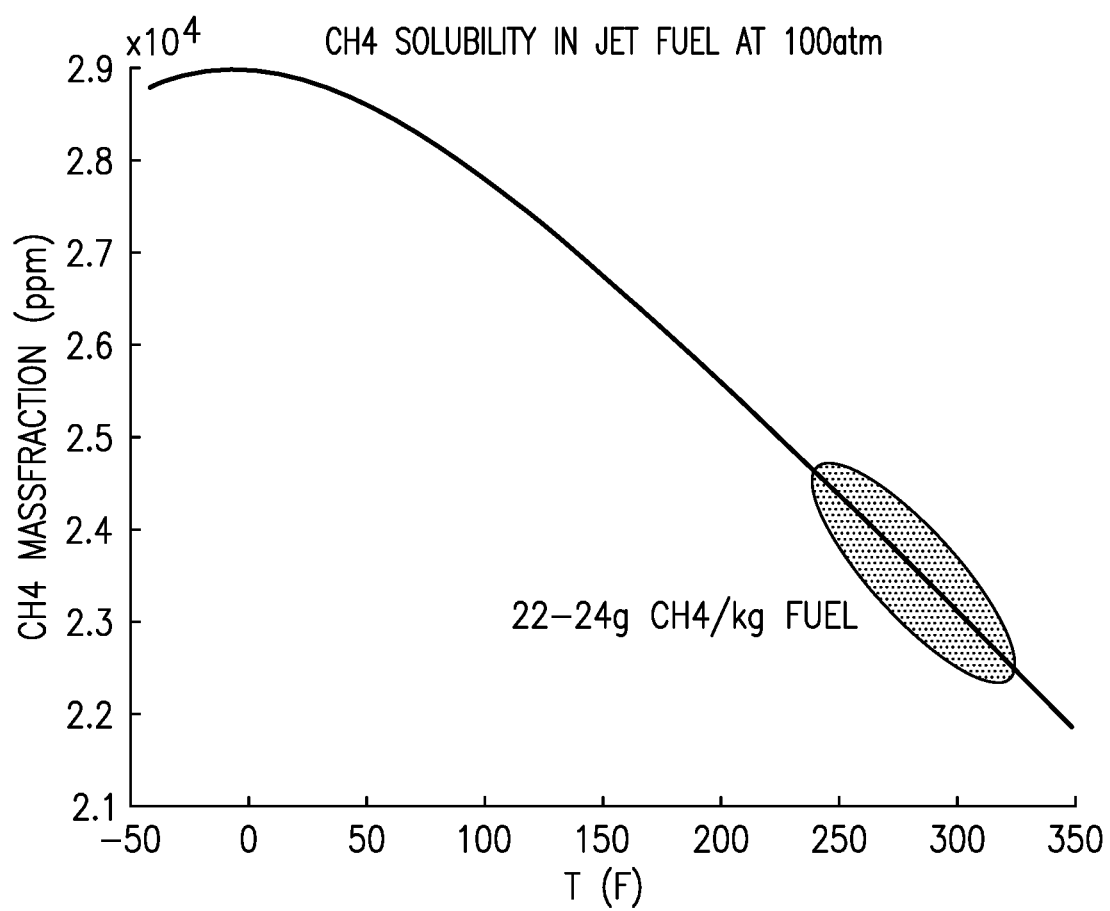
FIG. 2 is a graph showing solubility of liquid natural gas in aviation fuel across a temperature range, and at a particular pressure.

As an example, FIG. 2 is a graph showing the amount of liquid natural gas which is soluble within aviation fuel across a temperature range at a pressure of 100 atm.

The determination of the volume of liquid natural gas which is soluble in aviation fuel may be determined from a standard test method for estimation of solubility of gasses and petroleum and other organic liquids. ASTM D3827-92 is an example of a standard test method.

As shown in FIG. 2 at a particular pressure and temperature expected in a fighter jet fuel system downstream of high pressure pump 40, liquid natural gas is soluble at 22-24 grams/kilogram of fuel.

Now, controller 26 may control the stepper motor 28 and control valve 34 along with the fuel metering unit 38 to deliver cooling fluid across the thermal load 22 at those relative weight percentages to the weight of the fuel being delivered into line 41.

When this cooling liquid is delivered into the fuel metering unit 38, and eventually the fuel injectors 46, it is combusted and passes outwardly of the gas turbine engine. Thus, the liquid natural gas provides not only cooling for the thermal load 22, but also provides energy content for the engine 44. Also, no storage for spent cooling fluid is needed.

While liquid natural gas is specifically mentioned, it is known that its main component is methane. Thus, it could be said that the cooling fluid is a liquid containing methane. As an example, perhaps pure methane may be utilized.

In another embodiment, ammonia may be utilized as the cooling fluid. While ammonia might have a lower cooling capacity than the liquid natural gas, it still would have a significant cooling capacity.

Also, at the pressures and temperatures expected downstream of the high pressure pump 40, the ammonia would be soluble to about 2.5 grams/kilogram of aviation fuel.

A method and data for determining the solubility of ammonia across a pressure and temperature range may be found in *Ammonia, Amines, Phosphine, Arsine, Stibine, Silane, Germane and Stannane in Organic Solvents* by Young, C. L.; Fogg, P. G. T.

The liquid natural gas may be cooled to be below 0° F. In other applications, it may be cooled to be below −200° F. The ammonia may also be cooled.

The controller 26 is shown receiving information from the fuel pump 40. This information would provide the pressure and temperature of the fuel being delivered into line 41. The controller is programmed to determine a percentage solubility based upon that pressure and temperature. A look up table may be used based upon the included cooling liquid. Of course, other ways of determining a pressure and temperature of the fuel may be used.

The fuel pump 40 might have embedded sensors for determining the pressure and temperature of the fuel. Alternatively, a sensor 43 could be placed on the line 41 downstream of the pump 40. For that matter the sensor could be embedded within the fuel metering unit 38.

The controller may be part of a full authority digital electronic controller ("FADEC") for the entire engine or may be a standalone controller.

In general, it could be said that the cooling fluid is injected into the aviation fuel at less than 5% weight of the aviation fuel. More particularly, the cooling fluid is injected at a percentage which is less than its estimated solubility. Thus, the cooling fluid might be injected in a weight percentage between 0.1% and 2.2%.

Broadly, acceptable coolants can be described as a fluid which is a liquid at temperatures <0° F. and has a specific heat capacity equal to or greater than the aviation fuel. The cooling liquid must also be soluble in the main aircraft fuel and be combustible in the fuel-coolant-air mixture found in the combustor.

An aircraft system under this disclosure could be said to include a thermal load, a controller, a tank for storing a cooling liquid, and a supply system for moving the cooling liquid outwardly of the tank and through a control valve to the thermal load. The controller is programmed to control the supply system. A conduit downstream of the thermal load is configured to communicate the cooling liquid to a fuel metering unit. The fuel metering unit also receives fuel from a high pressure pump. The fuel metering unit is configured to deliver a mixture of the cooling liquid and the fuel into a combustor on an associated aircraft engine. The controller is programmed to determine a percentage solubility of the cooling fluid into the fuel at a detected temperature and pressure of the fuel reaching the fuel metering unit. The cooling fluid is combustible and soluble in the fuel.

A method of operating an aircraft system under this disclosure could be said to include moving a cooling liquid through a control valve to a thermal load, and downstream of the thermal load communicating the cooling liquid to a fuel metering unit. The fuel metering unit also receiving fuel from a high pressure pump. The fuel metering unit delivers a mixture of the cooling liquid and the fuel into a combustor on an associated aircraft engine. A percentage solubility of the cooling fluid into the fuel is determined at a temperature and pressure of the fuel reaching the fuel metering unit, and the determined percentage solubility is used to determine an amount of the cooling fluid to be delivered across the heat load.

Although embodiments have been disclosed, a worker of skill in this art would recognize that certain modifications would come within the scope of this disclosure. For that reason, the following claims should be studied to determine the true scope and content.

What is claimed is:

1. An aircraft system comprising:
   a thermal load;
   a controller, a tank for storing a cooling liquid, and a supply system for moving the cooling liquid outwardly of the tank and through a control valve to the thermal load, said controller being programmed to control the supply system, a conduit downstream of the thermal load configured to communicate the cooling liquid to a fuel metering unit, the fuel metering unit also receiving fuel from a high pressure pump, and the fuel metering unit configured to deliver a mixture of the cooling liquid and the fuel into a combustor on an associated aircraft engine;
   the controller being programmed to determine a percentage solubility of the cooling fluid into the fuel at a detected temperature and pressure of the fuel reaching the fuel metering unit; and
   wherein the cooling fluid is combustible and soluble in the fuel.

2. The system as set forth in claim 1, wherein the percentage solubility is less than 5%.

3. The system as set forth in claim 2, wherein the percentage solubility is between 0.1% and 2.2%.

4. The system as set forth in claim 1, wherein the cooling liquid at the storage tank is at a temperature below 0° F.

5. The system as set forth in claim 1, wherein the cooling fluid includes methane.

6. The system as set forth in claim 1, wherein the cooling fluid is ammonia.

7. The system as set forth in claim 1, wherein the thermal load is one of a communication system, a directed energy weapon, a radar jamming system, or an electronic control.

8. The system as set forth in claim 1, wherein the thermal load is created at unpredictable intervals and creates a high cooling load at the thermal load.

9. An aircraft comprising:
   an aircraft body;
   the aircraft body holding a thermal load;
   a controller, a tank for storing a cooling liquid, and a supply system for moving the cooling liquid outwardly of the tank and through a control valve to the thermal load, said controller being programmed to control the supply system, a conduit downstream of the thermal load adapted to communicate the cooling liquid to a fuel metering unit, the fuel metering unit also receiving fuel from a high pressure pump, and the fuel metering unit adapted to deliver a mixture of the cooling liquid and the fuel into a combustor on an associated aircraft engine;

the controller being programmed to determine a percentage solubility of the cooling fluid into the fuel at a detected temperature and pressure of the fuel reaching the fuel metering unit; and wherein the cooling fluid is combustible and soluble in the fuel.

10. The aircraft as set forth in claim 9, wherein the percentage solubility is less than 5%.

11. The aircraft as set forth in claim 10, wherein the solubility percentage is between 0.1% and 2.2%.

12. The aircraft as set forth in claim 9, wherein the cooling liquid at the storage tank is at a temperature below 0° F.

13. The aircraft as set forth in claim 9, wherein the cooling fluid includes methane.

14. The aircraft as set forth in claim 9, wherein the cooling fluid is ammonia.

15. The aircraft as set forth in claim 9, wherein the thermal load is one of a communication system, a directed energy weapon, a radar jamming system, or an electronic control.

16. The aircraft as set forth in claim 9, wherein the thermal load is created at unpredictable intervals and creates a high cooling load at the thermal load.

17. A method of operating an aircraft system:

moving a cooling liquid, that is combustible and soluble in aviation fuel, through a control valve to a thermal load, downstream of the thermal load communicating the cooling liquid to a fuel metering unit, the fuel metering unit also receiving fuel from a high pressure pump, and the fuel metering unit delivering a mixture of the cooling liquid and the fuel into a combustor on an associated aircraft engine; and determining a percentage solubility of the cooling fluid into the fuel at a temperature and pressure of the fuel reaching the fuel metering unit and using the determined percentage solubility to determine an amount of the cooling fluid to be delivered across the thermal load.

18. The method as set forth in claim 17, wherein the solubility of less than 5%.

19. The method as set forth in claim 17, wherein the cooling fluid contains methane.

20. The method as set forth in claim 17, wherein the cooling fluid is ammonia.

21. The method as set forth in claim 17, wherein the thermal load is created at unpredictable intervals and creates a high cooling load at the thermal load.

* * * * *